United States Patent [19]
Crick et al.

[11] Patent Number: 5,432,941
[45] Date of Patent: Jul. 11, 1995

[54] METHOD AND SYSTEM FOR DYNAMICALLY CONFIGURING A SOFTWARE SYSTEM USING CONFIGURATION GROUPS

[75] Inventors: Andrew P. R. Crick, Woodinville; Seetharaman Harikrishnan, Bellevue; Harish K. Naidu; William G. Parry, both of Redmond, all of Wash.

[73] Assignee: Microsoft Corporation, Redmond, Wash.

[21] Appl. No.: 960,926

[22] Filed: Oct. 13, 1992

[51] Int. Cl.⁶ .............................................. G06F 13/10
[52] U.S. Cl. .................... 395/700; 395/275; 364/DIG. 2; 364/935.42
[58] Field of Search ................ 364/DIG. 1 MS File; 395/700, 275

[56] References Cited
U.S. PATENT DOCUMENTS

4,468,736 8/1984 DeSantis et al. ............. 364/DIG. 1
4,589,063 5/1986 Shah et al. ............................ 364/200
5,075,847 12/1991 Fromme .............................. 395/700

*Primary Examiner*—Thomas M. Heckler
*Attorney, Agent, or Firm*—Seed and Berry

[57] ABSTRACT

In a preferred embodiment, a multiplicity of software routines are defined. During configuration of the software system, a plurality of the software routines are selected for inclusion in the software system. Before configuring the software system, each of the multiplicity of software routines is assigned a configuration group. When configuring the software system, each of the multiplicity of software routines is invoked, one configuration group at a time. Each invoked software routine determines whether it should be included in the software system. This determination may be based on which other software routines are already included. Thus, by changing the assigned configuration order of a software routine, the configuration of the software system can be changed.

27 Claims, 9 Drawing Sheets

METHOD AND SYSTEM FOR DYNAMICALLY CONFIGURING A SOFTWARE SYSTEM USING CONFIGURATION GROUPS

TECHNICAL FIELD

The present invention relates generally to the field of software architecture and, more particularly, to a method and system for dynamically configuring software routines in a layered architecture using configuration groups.

BACKGROUND OF THE INVENTION

A computer system typically is connected to various peripheral devices, which may include disk drives, tape drives, printers, and modems. The computer system has an operating system that provides an interface between an application program and these devices. The operating system receives from the application program a request to access one of the devices and translates this request to a request that will be understandable by that device. The operating system sends the translated request to the device and typically informs the application program when the request is complete.

The portion of the operating system that translates a request to access a device and controls communications with that device is typically referred to as a device driver. For example, an application program may request the operating system to read a file stored on a disk drive. The operating system would invoke a device driver provided for the disk drive and send the device driver this read request. The disk device driver would translate the read request by determining the actual disk location at which the file is stored, and would send the read request to the disk drive. The disk drive would then service the read request by reading the disk at the determined actual disk location, and then inform the device driver upon completion. The device driver would then inform the application program that the request has been serviced.

Figure 1:
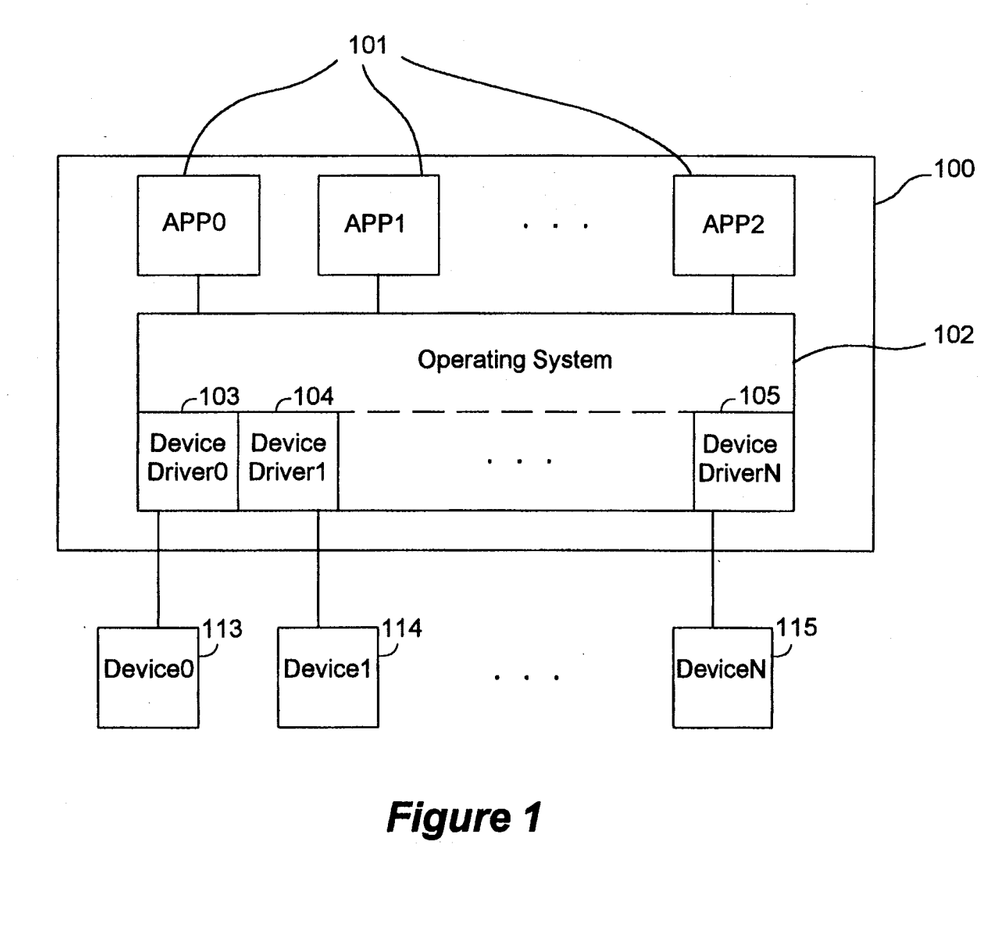
FIG. 1 is a block diagram illustrating the use of a device driver in a computer system.

FIG. 1 is a block diagram illustrating the use of a device driver in a computer system. The computer system comprises a computer 100 and a plurality of devices 113, 114, 115. The computer 100 includes various application programs 101 and an operating system 102. The application programs 101 request services of the devices through the operating system 102. The operating system 102 receives such a request and invokes an appropriate device driver 103, 104, 105 to service the request. The device driver 103, 104, 105 then translates the request and sends it to the device 113, 114, 115, respectively. It should be noted that, although a device driver can correspond to any number of devices, only one device for each device driver is shown for simplicity of explanation.

Prior device drivers typically have been developed by the manufacturer of each corresponding device. The developer of the operating system typically publishes a specification of the interface between the operating system and a device driver. The manufacturer of the device develops the device driver necessary to communicate with its corresponding device using this specification. After developing the device driver, the manufacturer of the device will often add various features to the device driver to enhance the marketability of the device. For example, a manufacturer of a disk drive may provide a device driver with data compression, data encryption, or disk caching options. Unfortunately, as more options are added to the device driver, the device driver becomes more complex. As the complexity of a device driver increases, the more difficult it becomes for a manufacturer to modify and test the device driver. For example, the addition of data compression, data encryption, or disk caching typically requires changes to be made throughout the device driver code in order to accommodate these options.

An additional problem is that the complexity of distributing device drivers increases when the device manufacturer integrates third party software into its device driver. For example, if a third party develops a particularly efficient data compression program, the third party developer may sell the program to various device manufacturers. Each manufacturer would then integrate the data compression program into its own device driver. Once the integration is complete, each manufacturer would then distribute the new device driver directly to its customers or indirectly through the operating system developer when a new version of the operating system is released.

SUMMARY OF THE INVENTION

It is an object of the present invention to provide a method and system for dynamically configuring device drivers.

It is another object of the present invention to provide a method and system for configuring a device driver into layers of component drivers.

It is another object of the present invention to provided a method and system in which each component driver specifies into which layer it should be configured.

It is another object of the present invention to provide a method and system in which device drivers can be configured to include new features without the need for the device manufacturer to integrate the new features.

It is another object of the present invention to provide a method and system in which new features developed by third parties can be dynamically configured into a device driver.

These and other objects, which will become apparent as the invention is more fully described below, are obtained by a method and system for configuring a software system. In a preferred embodiment, a multiplicity of software routines are defined. During configuration of the software system, a plurality of the software routines are selected for inclusion in the software system. Before configuring the software system, each of the multiplicity of software routines is assigned a configuration group. When configuring the software system, each of the multiplicity of software routines is invoked, one configuration group at a time. Each invoked software routine determines whether it should be included in the software system. This determination may be based on which other software routines are already included. Thus, by designating the assigned configuration group of a software routine, the configuration of the software system can be selected.

To define the configuration groups, a group of software routines is assigned a configuration order. The software routines with the same configuration order are known as a configuration group. A software routine may belong to more than one configuration group. When configuring the software system, the software routines are invoked, one configuration group at a time such that software routines having a same configuration order are invoked together. Thus, during configuration, a software routine is invoked once for each configuration group to which it belongs. Each software routine contains along with executable code a list of the configuration groups to which it belongs. When configuring the software system, each software routine is invoked and thereby given an opportunity to select itself for inclusion in the software system. An example of this process is described in detail, where the software system is a device driver and the software routines are component drivers within the device driver, in U.S. patent application Ser. No. 07/954,920, entitled Method and System for Configuring and Executing Device Drivers, which is hereby incorporated by reference In a preferred embodiment, an operating system configures a device driver (software system) for a device to include a plurality of component drivers (software routines) as described in the above-referenced patent application. Each component driver performs a function of the device driver and contains a list of configuration groups to which it belongs. To configure the device driver, the operating system first loads all of the component drivers into memory and retrieves the list of configuration groups from each component driver. The operating system also defines a call-down table for the device driver. The operating system then invokes the component drivers a configuration group at a time, based on the retrieved lists. When a component driver determines that it should be included in the device driver, the component driver pushes a reference to itself onto the call-down table, which functions as a pushdown stack. When the configuration is complete, the call-down table contains a reference to each component driver configured into the device driver. To execute the device driver, the operating system invokes the component drivers referenced by the call-down table. When each component driver completes its function, it returns to the invoking component driver. The component driver referenced by the top reference in the call-down table returns to the operating system.

DETAILED DESCRIPTION OF THE INVENTION

The present invention provides a method and system for dynamically configuring a software system to include a plurality of software routines that are organized into configuration groups. The present invention selects which software routines to include in the software system. Before configuration of the software system, each software routine is assigned to a configuration group that has, for example, a configuration order. A software routine may belong to more than one configuration group. When configuring the software system, the software routines are invoked one configuration group at a time. For example, the software routines are invoked starting with the software routines in the configuration group with the lowest configuration order (the lowest configuration group). Each software routine when invoked determines whether it should be included in the software system and, if it should be included, includes itself into the software system.

Figure 2:
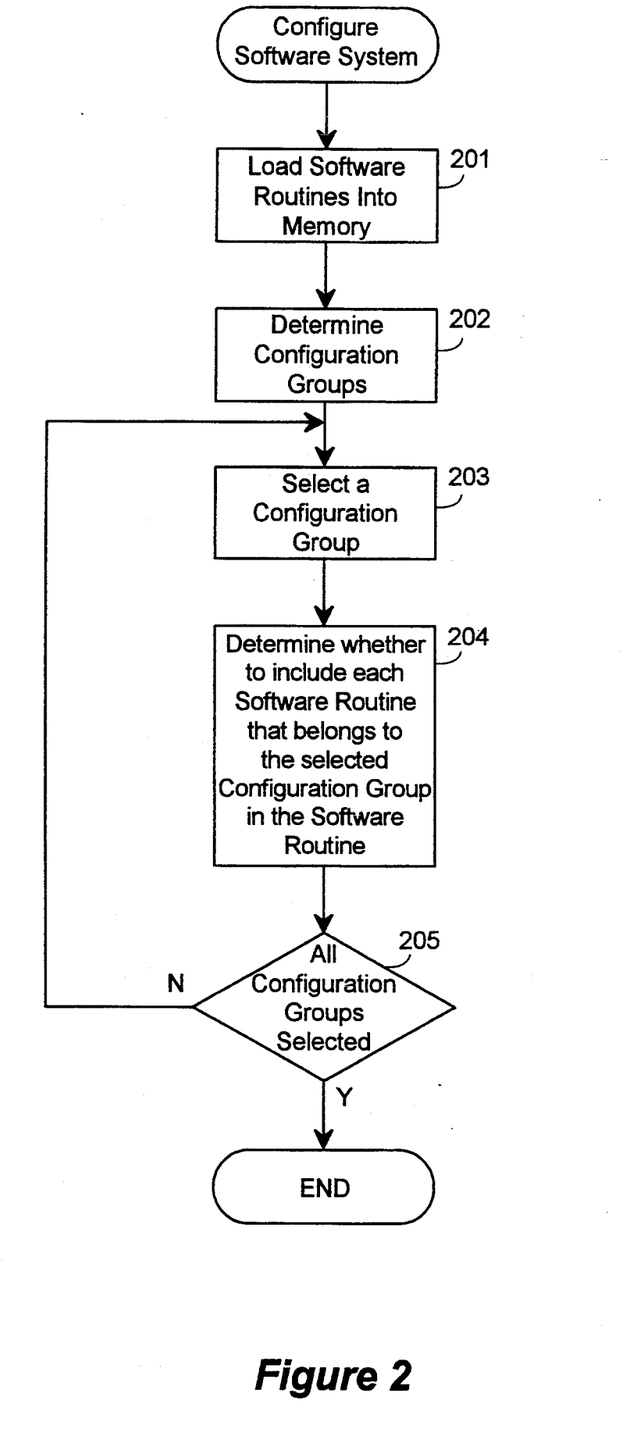
FIG. 2 is a flow diagram of the Dynamic Load routine.

FIG. 2 is an overview flow diagram of a preferred system for configuring a software system in accordance with the present invention. In step 201, the system loads into memory all the software routines that are available to be configured into a software system. In step 202, the system determines to which configuration groups each software routine belongs. In a preferred embodiment, the executable code for each software routine contains a list of the configuration groups to which it belongs. The system retrieves the list from each software routine to make the determination. In step 203, the system selects the lowest configuration group that has not already been selected. In step 204, the system determines whether to include each software routine that belongs to the selected configuration group in the software system. For example, each software routine in the selected configuration group is invoked to determine whether to be included in the software system, as described in the above-referenced application, and if it should be included, includes itself in the software system. In step 205, if all configuration groups have been selected, then the configuration is complete, else the system loops to step 203 to process the routines in another configuration group.

In an actual embodiment, an operating system configures a device driver (software system) to include a plurality of component drivers (software routine). Each component driver performs a function of the device driver and contains a list of configuration groups to which it belongs. To configure the device driver, the operating system first loads all of the component drivers into memory and retrieves the list of configuration groups from each component driver. The operating system also defines a call-down table for the device driver. The operating system then invokes the component drivers in an order based on the retrieved lists of configuration groups. When a component driver determines that it should be included in the device driver, the component driver pushes a reference to itself onto the call-down table, which functions as a push-down stack. When the configuration is complete, the call-down table contains a reference to each component driver configured into the device driver. The call-down table organizes the component drivers that are configured into the device driver into layers. To execute the device driver, the operating system invokes the component drivers referenced by the call-down table.

Processing an Input/Output Request

Figure 3:
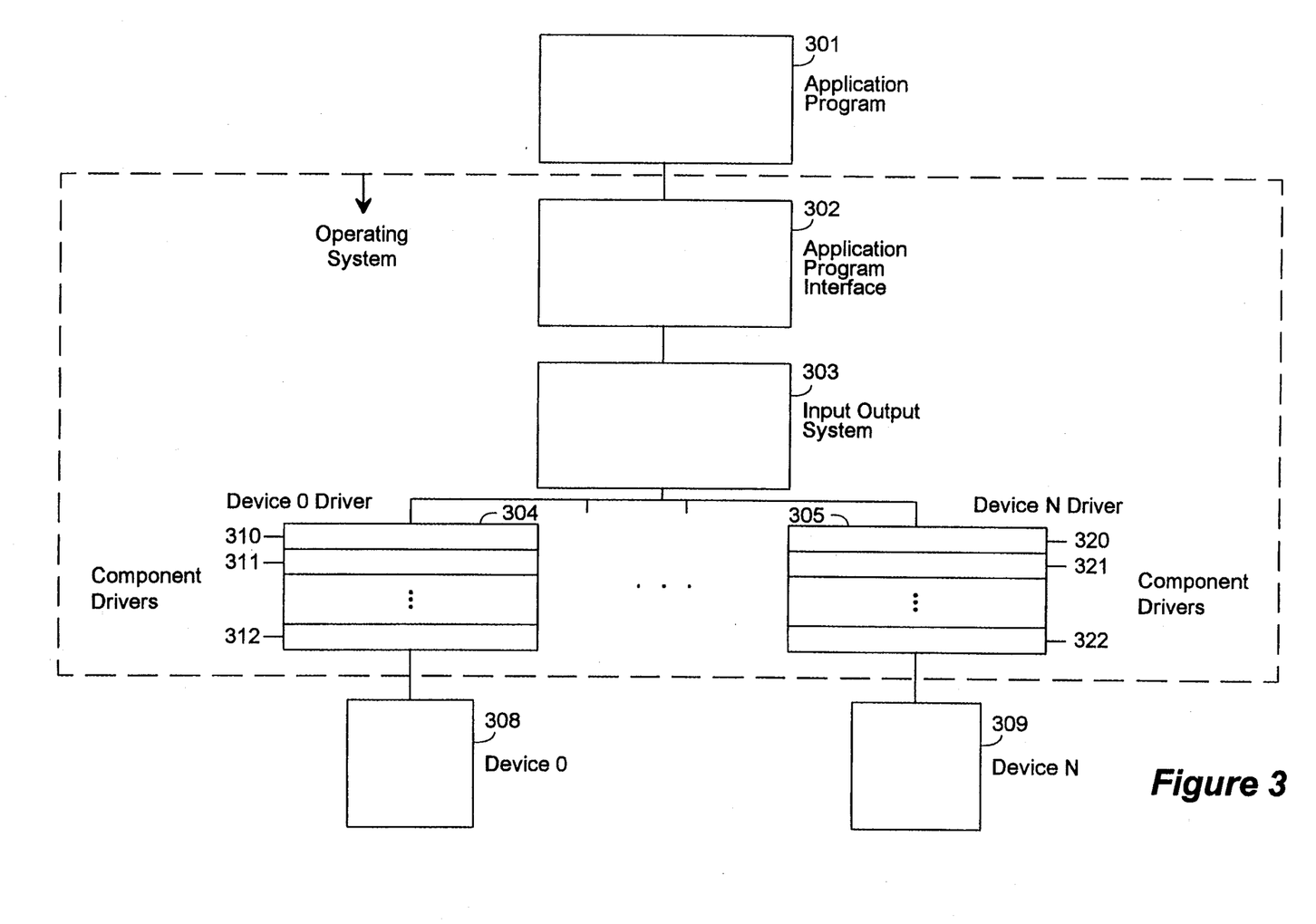
FIG. 3 is a block diagram illustrating components of the present invention.

FIG. 3 is a block diagram illustrating a computer system having multiple device drivers, each configured in accordance with a preferred embodiment of the present invention. The computer system in FIG. 3 functions as follows. An application program 301 formulates Input/Output (I/O) requests and passes the requests to the operating system through an application program interface 302. The application program interface 302 provides the application program with access to the operating system. When the application program interface 302 receives an I/O request, it invokes the input-output system (IOS) 303, passing it the request. The input-output system determines which device driver 304, 305 will service the request depending on which device 308, 309 is requested. Again, for simplicity of explanation, only one device per device driver is shown. Device driver 304 comprises component drivers 310 and 311 through 312, and device driver 305 comprises component drivers 320 and 321 through 322. The component drivers in the devices can be described as layers. Within the device drivers, for example, the component drivers 310 and 320 are top layers and component drivers 312 and 322 are bottom layers. Upon receiving the I/O request, the input-output system invokes the top layer component driver for the appropriate device driver. The method for determining which device driver to invoke is described in the above-incorporated application. The top layer component driver performs component driver specific functions and invokes, when appropriate, the next lower layer component driver. The next lower layer component driver performs its own component driver specific functions and invokes, when appropriate, the next lower layer component driver, and so on. The bottom layer component driver interacts most closely with the device, typically accessing the device via an adapter.

Figure 4:
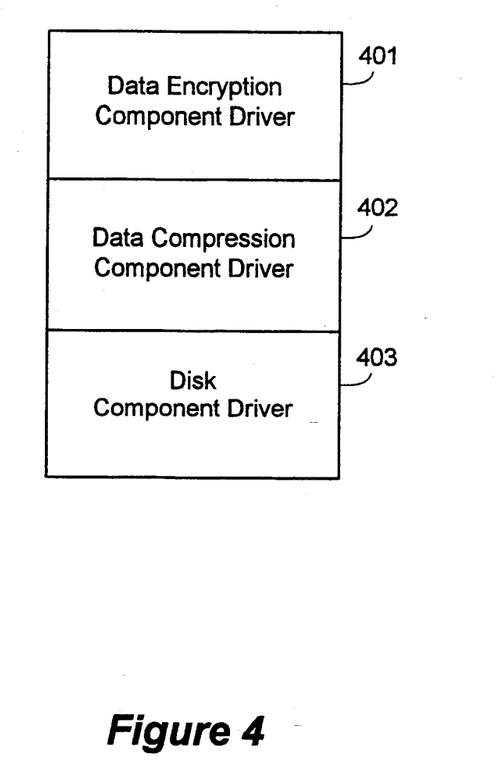
FIG. 4 is a block diagram showing a sample disk drive device driver.

FIG. 4 is a block diagram showing a sample disk drive device driver that is configured by the present invention. The disk drive device driver would be configured by the present invention as, for example, the device driver 304 if the device 308 were a disk drive. The device driver is implemented to perform synchronous I/O and includes a data encryption component driver 401, a data compression component driver 402, and a disk component driver 403. The data encryption component driver encrypts or decrypts data and passes requests to the data compression driver. The data compression component driver compresses or decompresses data and passes requests along to the disk component driver. The disk component driver controls the reading and writing of the data to the disk drive through a disk drive adapter (not shown).

Upon receiving a write request to access the disk drive, for example, the IOS 303 invokes the data encryption component driver 401, passing it the request to write data. When requested to write data, the data encryption component driver encrypts the data and then invokes the data compression component driver 402, passing it the write request along with the encrypted data. The data compression component driver compresses the encrypted data and then invokes the disk component driver 403, passing it the write request along with the compressed data. The disk component driver 403 accesses the disk drive to write the data to the disk.

Figure 5:
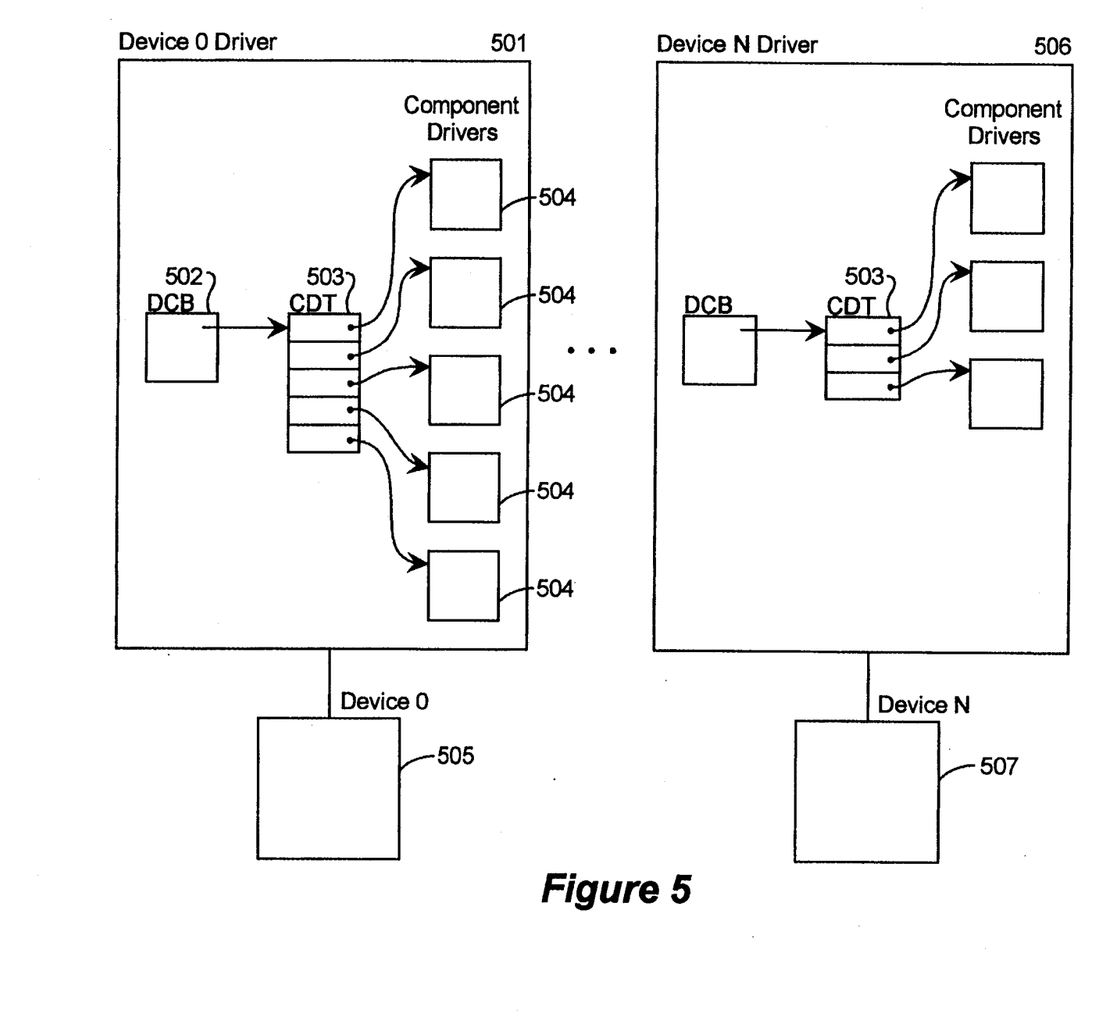
FIG. 5 is a block diagram illustrating the data structures that support the selection and configuring of component drivers.

FIG. 5 is a block diagram illustrating the data structures that support the layering of component drivers in a device driver. These structures are established in part by the present invention, as will become evident. Device driver 501 contains a device control block (DCB) 502, a call-down table (CDT) 503, and a plurality of component drivers 504. Each component driver contains executable code and a list of configuration groups to which the software routine is assigned. Device driver 501 corresponds to a device 505. In a preferred embodiment of the invention, the device control block 502 contains as device-specific information (e.g., type of the device 505 (disk drive, tape drive, printer, modem, etc.)), pointer to the call-down table 503 and an entry pointer. The call-down table 503 contains entries that have pointers that point to the component drivers 504 of the device driver 501. In a preferred embodiment, multiple devices are provided and other device drivers are provided which have a similar data structure, as shown by device driver 506 and device 507. Each of the component drivers 504 is potentially available as a layer in any of the device drivers provided.

The call-down table 503 specifies the order in which the component drivers of a device driver are executed to process an I/O request. The top (first) entry in the call-down table points to the top (first) layer component driver. The second entry in the call-down table points to the second layer component driver, and so on.

Once the data structures are established, the IOS invokes a device driver by retrieving the device control block 502 for that device driver, retrieving the pointer to the call-down table 503 from the device control block, retrieving the top entry from the call-down table, storing in the device control block an entry pointer that points to the top entry, and invoking the top layer component driver pointed to by the entry pointer. The component driver is passed the device control block. The component driver uses the entry pointer stored in the device control block to determine which component driver is at the next lower layer. This is done by referencing the next CDT entry below the entry pointed to by the DCB entry pointer. The component driver adjusts the entry pointer in the device control block to point to the entry for the next lower component driver and then invokes that component driver. The bottom layer component driver invokes no component driver, but rather interacts with the device via an adapter, etc.

Figure 6:
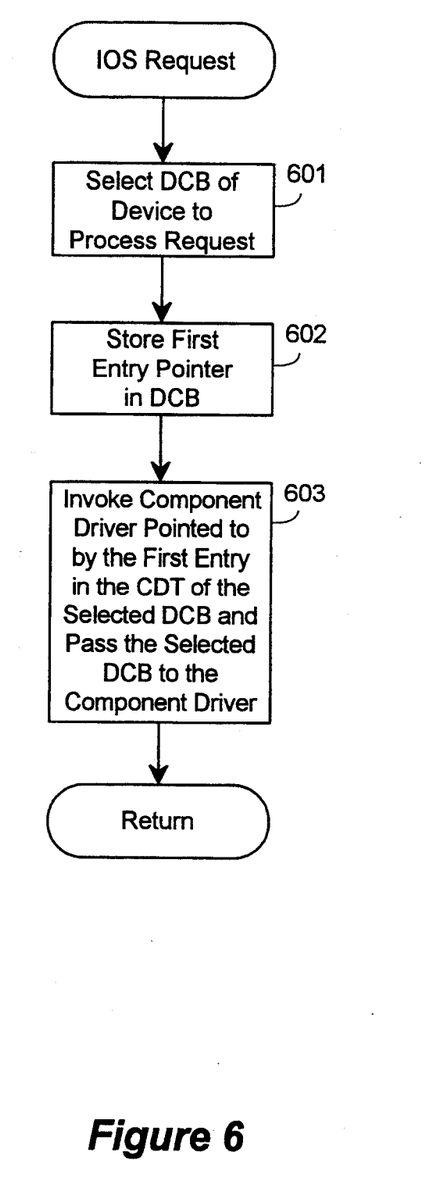
FIG. 6 is a flow diagram of the input-output system (IOS) request routine.

FIG. 6 is a flow diagram of the IOS request routine that processes requests from the application programming interface. The IOS request routine inputs an I/O request, determines which device driver should be invoked, and invokes the first component driver of the device driver. In step 601, the IOS routine selects the device control block of the device driver that is to process the request. In step 602, the IOS routine stores in the device control block entry pointer a reference to the first entry of the call-down table of the selected device control block. The storing of this entry pointer allows the first component driver to determine its corresponding entry in the call-down table for the selected device driver. In step 603, the IOS routine invokes the component driver pointed to by the first entry in the call-down table of the device control block, passing it a pointer to the selected device control block.

Figure 7:
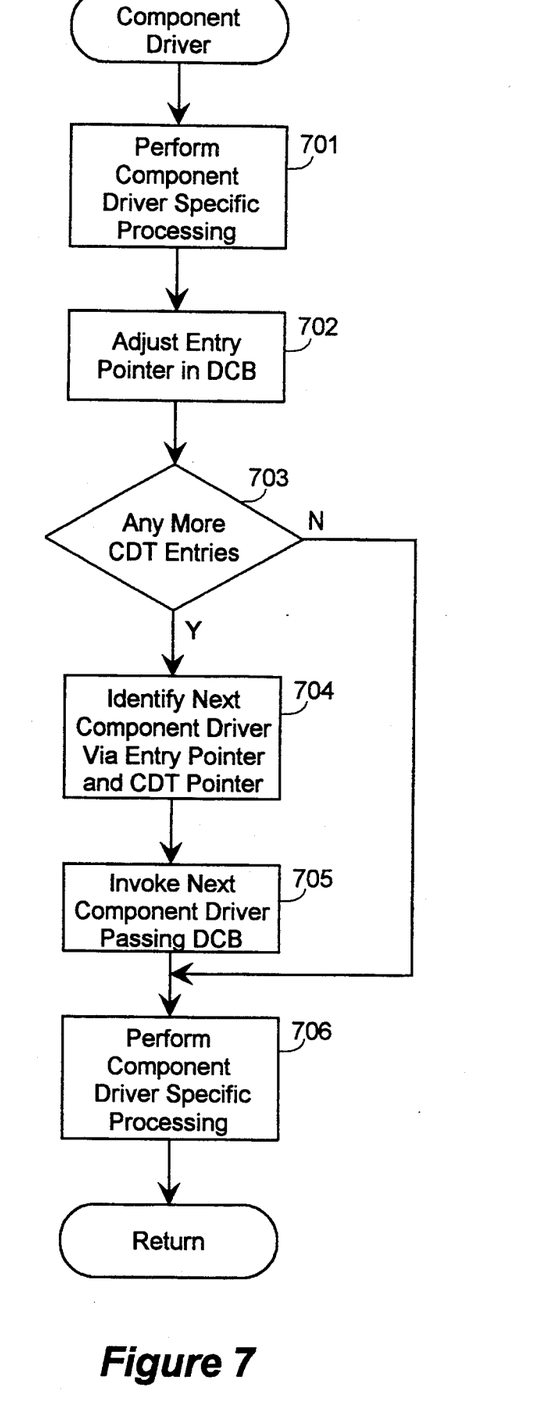
FIG. 7 is a flow diagram of a sample component driver.

FIG. 7 is a flow diagram of the execution of a sample component driver processing an I/O request. The process is called from block 603 of FIG. 6. The component driver is passed the device control block. The component driver performs its component driver specific functions and invokes the component driver pointed to by the next call-down table entry. In step 701, the component driver performs component driver specific processing (e.g., data encryption and data compression) that is appropriate before invoking the next lower layer component driver. In step 702, the component driver adjusts the entry pointer in the device control block to point to the CDT entry for the next component driver.

In step 703, if there are no more call-down table entries, then this component driver is the bottom layer component driver and the component driver continues at step 706, else the component driver continues at step 704. In step 704, the component driver identifies the next component driver pointed to by the entry pointer. In step 705, the component driver invokes the identified component driver, passing it a pointer to the device control block. Thus, the process, beginning at step 701, is repeated for the next component driver. In step 706, after the next component driver returns (completes processing), the component driver performs component driver specific processing that is appropriate after return of the next lower layer component driver (e.g. data decompression or data decryption). The component driver then returns.

Configuring the Device Drivers

Figure 8:
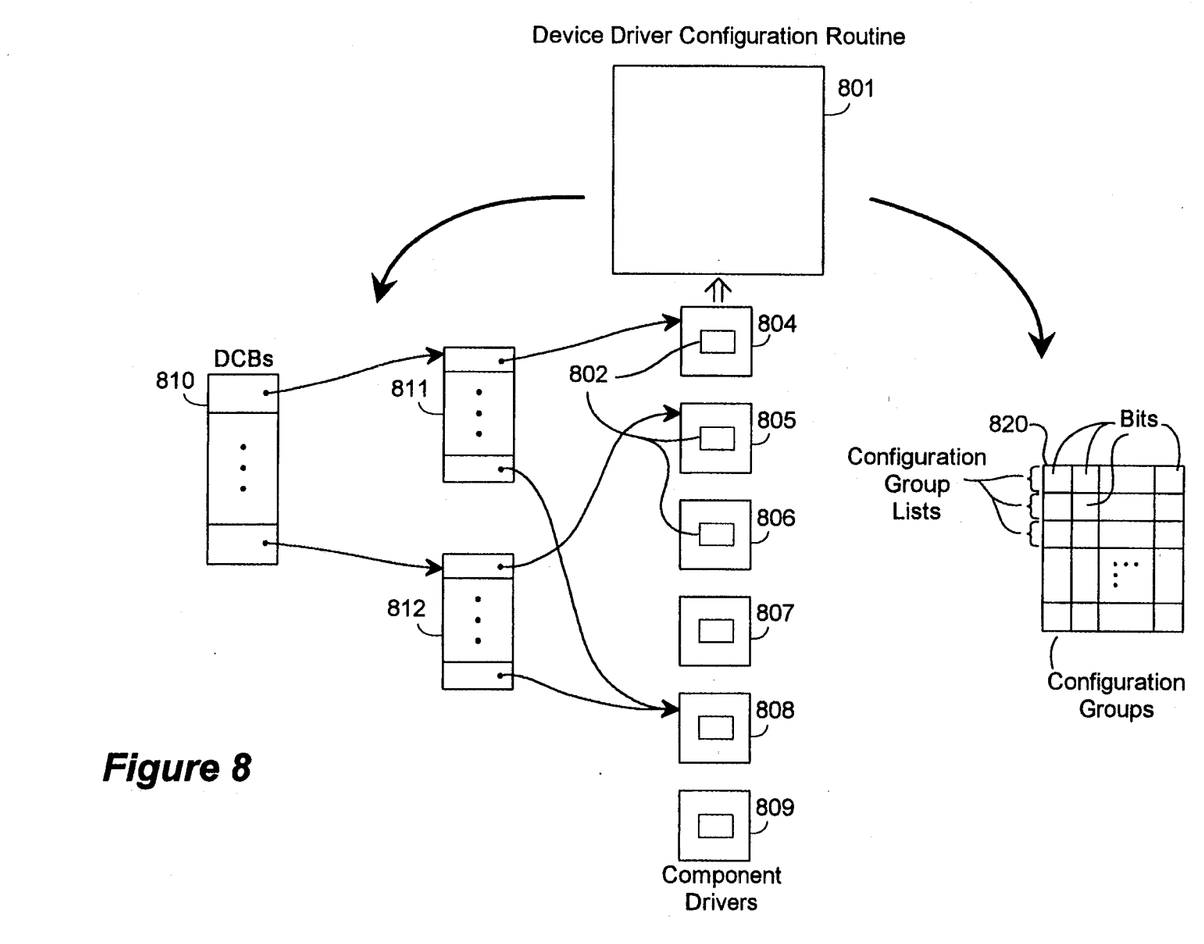
FIG. 8 is a block diagram illustrating device driver configuration by the IOS.

FIG. 8 is a block diagram illustrating the device driver configuration process of the present invention performed by the IOS. In a preferred embodiment, the computer system configures the device drivers at computer startup. At computer startup, the operating system invokes the device driver configuration routine 801. The device driver configuration routine creates a device control block 810 and call-down tables 811, 812 for each device or group of devices controlled by the routine and loads into memory the component drivers 804–809 that are available to be configured into device drivers. Each component driver can be included as a layer in several device drivers. That is, the call-down table entries for the several device drivers can contain a pointer to the same component driver. This permits the sharing of component driver code between device drivers. Each component driver contains a configuration group list 802, which indicates the configuration groups to which the component driver belongs. In a preferred embodiment, the configuration group list is represented by one bit for each configuration group. If a bit is set, then the component driver belongs to that configuration group. Otherwise, the component driver does not belong to that configuration group. The device driver configuration routine retrieves the configuration group list from each component driver and stores it in a configuration table 620 of configuration group lists. Each set of bits having the same bit position in all configuration group lists represents a configuration group. When a bit in the configuration table 620 is set, then the corresponding component driver belongs to the corresponding configuration group. The device driver configuration routine processes the component drivers a configuration group at a time.

In a preferred embodiment, within a configuration group, the configuration routine invokes each component driver to determine whether to include itself in the device driver. This determination may be based on the type of the device and which component drivers have already been included in the device driver. The configuration routine invokes each component driver in each configuration group once for each device driver and passes the component driver the device control block for the device. The component driver then determines whether it should be included in the device driver for the device corresponding to the passed device control block. Such a determination is explained in detail in the above-incorporated application. If the component driver determines that it should be included in the device driver, then the component driver adds a reference to itself to a call-down table. The call-down table functions as a stack in that references (entries) are pushed onto the top of the call-down table and existing entries are pushed down. A single component driver may be called several times during configuration; it will be called once for each configuration group in which it belongs.

Figure 9:
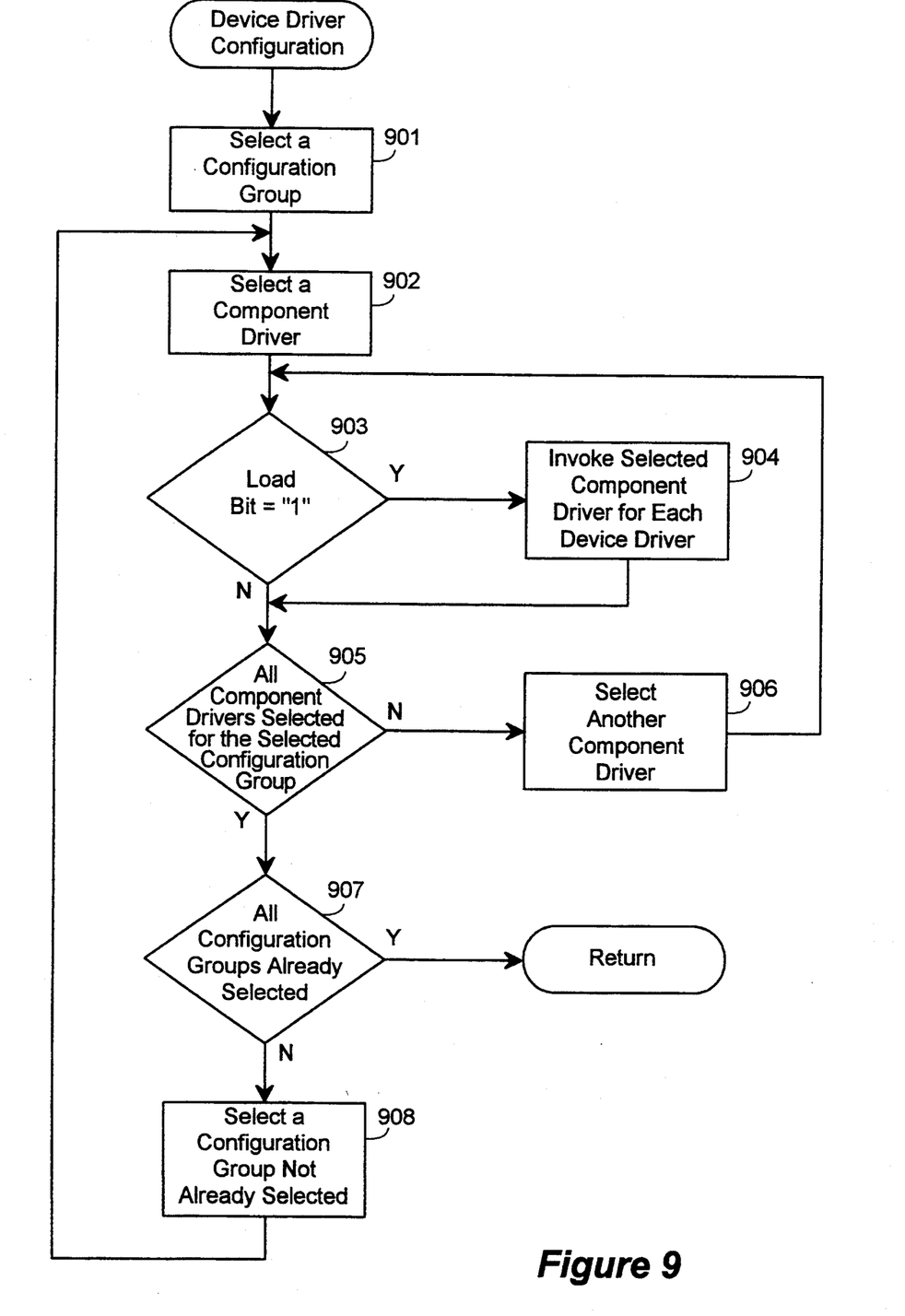
FIG. 9 is a flow diagram of a device driver configuration routine.

FIG. 9 is a flow diagram of a device driver configuration routine that is processed for a given device. For every component driver in each configuration group, the device driver configuration routine invokes the component driver once, passing it the corresponding device control block. The component driver determines whether it should be included in the device driver and, if so, pushes a reference to itself onto the call-down table. In an alternate embodiment, a device driver contains at most one component driver from each configuration group. This limitation then becomes part of the determination process.

In step 901, the device driver configuration routine selects a configuration group not already selected. In step 902, the routine selects a first component driver to determine whether it belongs to the selected configuration group. In step 903, if the bit in the configuration group list for the selected component driver is set to "1," then the routine invokes the component driver to determine whether the selected component driver should be included in the device driver. The routine invokes the component driver, passing it to the device control block in step 904. The process described in the above-incorporated application is then carried out. When the routine returns, the selected component driver has had the opportunity to add itself to the call-down table. In step 905, if all the component drivers have not been selected for the selected configuration group, then the device driver configuration routine selects a component driver not already selected in step 902. Otherwise, the routine continues to step 907 and determines whether all the configuration groups have already been selected. If not, the routine selects a configuration group not already selected in step 908 and loops to steps 902 through 907. Otherwise, the routine returns.

The ordered selection of the configuration groups may be done by initially assigning each configuration group an order number. This number may be based on a predetermined order in which the configuration groups should be called as determined by the manufacturer of the device driver. The configuration group order number may be part of the configuration matrix. In a preferred embodiment, the lowest ordered configuration group is selected first, e.g., at the first invocation of step 901 in FIG. 9. Each time step 901 is encountered, the next highest configuration group is selected. Thus, the last configuration group to be selected would be the configuration group with the highest order number. In this manner, control over the order in which the configuration groups are selected as well as over which component drivers make up a group are provided by the present invention.

Although the present invention has been described in terms of a preferred embodiment, it is not intended that the invention be limited to these embodiments. Other uses and modifications within the spirit of the invention will be apparent to those skilled in the art. The scope of the present invention is defined in the claims which follow.

What is claimed is:

1. A method in a computer system of configuring a software system to include a subset of an available plurality of software routines, the method comprising the computer-implemented steps of:
   retrieving a multiplicity of indications, each indication associating one of the available plurality of software routines with one of a plurality of configuration groups, each of the configuration groups having a unique identity;
   selecting, for each of the configuration groups, in an order based upon the identities of the configuration groups, which of the software routines associated with the configuration group to include in the software system; and
   including the selected software routines in the software system.

2. The method of claim 1 wherein each software routine includes executable code and an identification of the configuration groups to which the software routine is assigned.

3. The method of claim 1 wherein the retrieving step retrieves each indication from within a file containing executable code for executing the software routine.

4. The method of claim 1 wherein the step of including the selected software routines comprises organizing the selected software routines into layers forming the software system.

5. A method in a computer system of configuring a device driver to include a subset of an available plurality of component drivers, the method comprising the computer-implemented steps of:
   retrieving a multiplicity of indications, each indication associating one of the available plurality of component drivers with one of a plurality of configuration groups, each of the configuration groups having a unique identity;
   selecting, for each of the configuration groups, in an order based upon the identities of the configuration groups, which of the component drivers associated with the configuration group to include in the device driver; and
   including the selected component drivers in the device driver.

6. The method of claim 5 wherein each component driver includes executable code and a list of configuration groups to which the component driver is assigned.

7. The method of claim 5 wherein the retrieving step retrieves indications from lists of indications, each stored within a file containing executable code for executing a component driver.

8. The method of claim 5 wherein the step of including the selected component drivers comprises organizing the selected component drivers into layers forming the device driver.

9. A method in a computer system of configuring a software system to include a subset of a plurality of software routines, the method comprising the computer-implemented steps of:
   for each software routine, retrieving a list of one or more configuration orders associated with the software routine;
   initializing a plurality of configuration groups, each configuration group having associated with it a configuration order;
   for each software routine, for each configuration order associated with the software routine, assigning the software routine to a configuration group having associated with it the configuration order;
   selecting one configuration group at a time, based on the configuration order associated with each of the configuration groups; and
   determining for each selected configuration group which of the software routines assigned to the configuration group to include in the software system.

10. The method of claim 9 wherein the step of assigning the software routines assigns more than one software routine to at least one configuration group.

11. The method of claim 9 wherein each software routine includes executable code and a list of configuration groups to which the software routine is assigned.

12. The method of claim 9 wherein, for each software routine, the retrieved list of configuration groups with which the software routine is associated is stored within a file containing executable code for executing the software routine.

13. The method of claim 9 wherein the step of assigning assigns each of the plurality of software routines to one or more configuration groups.

14. The method of claim 9 wherein the step of including the selected software routines organizes the selected software routines into layers forming the software system.

15. A method in a computer system of configuring a device driver to include a plurality of component drivers, the method comprising the computer-implemented steps of:
   for each of a multiplicity of component drivers, retrieving a list of one or more configuration orders associated with the software routine;
   initializing a plurality of configuration groups, each configuration group having associated with it one configuration order;
   for each of the multiplicity of component drivers, for each configuration order associated with the component driver, assigning the component driver to a configuration group having associated with it the configuration order;
   identifying each configuration group in an order based on the configuration order associated with the configuration group and selecting which of the component drivers assigned to the identified configuration group to include in the device driver; and
   including the selected component drivers in the device driver.

16. The method of claim 15 wherein the step of assigning the component drivers assigns more than one component driver to at least one configuration group.

17. The method of claim 15 wherein each component driver includes executable code and a list of configuration groups to which the component driver is assigned.

18. The method of claim 15 wherein, for each component driver, the retrieved list of configuration groups with which the component driver is associated is stored within a file containing executable code for executing the component driver.

19. The method of claim 15 wherein the step of assigning assigns each of the plurality of component drivers to one or more configuration groups.

20. The method of claim 15 wherein the step of including the selected component drivers organizes the selected component drivers into layers forming the device driver.

21. A computer system for configuring a software system to include a plurality of software routines, the computer system comprising:
- a multiplicity of software routines each being assigned to at least one configuration group, such that at least one software routine is assigned to each of a plurality of configuration groups;
- means for selecting, a configuration group at a time, in an order based upon the identities of the configuration groups, which of the multiplicity of software routines assigned to the configuration group to include in the software system; and
- means for including in the software system the software routines that have been selected by the means for selecting the multiplicity of software routines.

22. The computer system of claim 21, further comprising a multiplicity of files, each storing the configuration order and executable code for executing one of the multiplicity of software routines.

23. The computer system of claim 21, further comprising means for organizing the multiplicity of software routines into layers, the layers forming the software system.

24. A computer system for configuring a device driver to include a plurality of component drivers, the computer system comprising:
- a multiplicity of component drivers each being assigned to at least one configuration group, such that at least one component driver is assigned to each of a plurality of configuration groups, each of the configuration groups having a unique identity;
- means for selecting, a configuration group at a time, in an order based upon the identities of the configuration groups, which of the multiplicity of component drivers assigned to the configuration group to include in the device driver; and
- means for including in the device driver component drivers that have been selected by the means for selecting the multiplicity of component drivers.

25. The computer system of claim 24 further comprising a multiplicity of files each storing the configuration order and executable code for executing one of the multiplicity of component drivers.

26. The computer system of claim 24 further comprising means for organizing the multiplicity of component drivers into layers, the layers forming the device driver.

27. The computer system of claim 24 wherein the multiplicity of component drivers are each assigned to a configuration group having a unique order number, and wherein the means for selecting component drivers to include in the device driver comprises means for selecting the configuration groups in an order based on the order numbers.

* * * * *